United States Patent

Auvenshine et al.

(10) Patent No.: US 10,248,320 B2
(45) Date of Patent: Apr. 2, 2019

(54) WORKLOAD-AWARE THIN-PROVISIONING STORAGE-ALLOCATION SYSTEM

(71) Applicant: International Business Machines Corporation, Armonk, NY (US)

(72) Inventors: John J. Auvenshine, Tucson, AZ (US); Rakesh Jain, San Jose, CA (US); James E. Olson, Seymour, CT (US); Mu Qiao, Belmont, CA (US); Ramani R. Routray, San Jose, CA (US); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 15/336,964

(22) Filed: Oct. 28, 2016

(65) Prior Publication Data

US 2018/0121100 A1     May 3, 2018

(51) Int. Cl.
    *G06F 12/00*     (2006.01)
    *G06F 3/06*     (2006.01)

(52) U.S. Cl.
    CPC .......... *G06F 3/0608* (2013.01); *G06F 3/0611* (2013.01); *G06F 3/0619* (2013.01); *G06F 3/0631* (2013.01); *G06F 3/0649* (2013.01); *G06F 3/0665* (2013.01); *G06F 3/0685* (2013.01); *G06F 3/0689* (2013.01); *G06F 3/061* (2013.01); *G06F 3/0637* (2013.01); *G06F 3/0644* (2013.01)

(58) Field of Classification Search
CPC .... G06F 3/0608; G06F 3/0665; G06F 3/0631; G06F 3/0652; G06F 3/061; G06F 3/0644; G06F 3/0637
USPC ........................................................ 711/114
See application file for complete search history.

(56) References Cited

U.S. PATENT DOCUMENTS

| 8,156,306 | B1 | 4/2012 | Raizen et al. | |
|---|---|---|---|---|
| 2008/0271039 | A1 | 10/2008 | Rolia et al. | |
| 2011/0258406 | A1* | 10/2011 | Suetsugu | G06F 3/0608 711/162 |
| 2011/0264868 | A1* | 10/2011 | Takata | G06F 3/0614 711/154 |
| 2011/0283078 | A1* | 11/2011 | Tamura | G06F 3/0611 711/170 |

(Continued)

*Primary Examiner* — Mardochee Chery
(74) *Attorney, Agent, or Firm* — Schmeiser, Olsen & Watts, LLP; Michael Petrocelli

(57) ABSTRACT

A method and associated systems for a workload-aware thin-provisioning system that allocates physical storage to virtual resources from pools of physical storage volumes. The system receives constraints that limit the amount of storage that can be allocated from each pool and the total workload that can be directed to each pool. It also receives lists of previous workloads and allocations associated with each volume at specific times in the past. The system then predicts future workloads and allocation requirements for each volume by regressing linear equations derived from the received data. If the predicted values indicate that a pool will at a future time violate a received constraint, the system computes the minimum costs to move each volume of the offending pool to a less-burdened pool. It then selects the lowest-cost combination of volume and destination pool and then moves the selected volume to the selected pool.

20 Claims, 3 Drawing Sheets

(56) References Cited

U.S. PATENT DOCUMENTS

2012/0166748 A1 6/2012 Satoyama et al.
2012/0221828 A1 8/2012 Fang et al.
2014/0223012 A1 8/2014 Agarwala et al.
2016/0077763 A1 3/2016 Gu et al.

* cited by examiner

WORKLOAD-AWARE THIN-PROVISIONING STORAGE-ALLOCATION SYSTEM

BACKGROUND

The present invention relates to improving the efficiency of a data-storage management system configured to allocate storage capacity by means of a thin-provisioning methodology.

Thin provisioning is a flexible method of space-efficiently allocating virtual storage to multiple users from one or more shared pools of physical computer-readable storage devices, such as a bank of rotating-media hard drives or an array of solid-state disks. Thin provisioning uses virtualization technology to provision virtual storage volumes that, in aggregate, may appear to offer greater total storage capacity than that of the physical pool.

A thin-provisioned storage device, such as a virtual disk drive, is thus associated with both a virtual storage capacity and a physical (or real) storage capacity. The device's virtual capacity is the capacity that is visible to a user or host, and the device's real capacity is the physical storage capacity that is actually allocated and available to the device.

In one example, a pool of physical hard drives may have a total aggregate physical storage capacity of 1,000 TB. A thin-provisioning storage-management utility or a thin-provisioning component of a storage-management system might provision a 3 TB virtual volume for each of 1,000 users, supporting each 3 TB virtual volume with 1 TB of physical storage. Although the users perceive a total of 3,000 TB of virtual storage, only 1,000 TB of physical storage is actually available.

This thin-provisioning strategy works because the thin-provisioning system has estimated that each user, on average, is likely to consume less than 1 TB of physical storage. If one user does at some point require more than 1 TB of real storage space, the thin-provisioning mechanism must transfer additional physical storage capacity to that user from a second user who needs less than 1 TB of physical storage.

It is thus important for thin-provisioned storage devices to configure enough real capacity to ensure that users do not run out of physical storage, but not configure so much that a large amount of excess physical capacity is wasted. A failure to meet both these criteria can reduce the efficiency of a storage-management system by either increasing the frequency of reprovisioning tasks or by wasting valuable physical storage capacity.

Load-balancing is another function performed by virtualized-storage management systems. This task requires the storage management system to direct workloads (which may be measured as input/output operations per second or IOPS) to storage devices in a balanced manner. For example, a load-balancing component of a storage-management system might try to avoid overloading a first hard drive with a transaction-processing system's high volume of read/write operations by instead directing those operations (and the data upon which the operations are performed) to a second drive that has a lighter workload.

In a thin-provisioning system, load-balancing tasks are generally considered to be unrelated to storage-allocation, but the two functions are not completely independent. In one example, additional physical storage may be allocated to a virtual drive in order to allow the virtual drive to store data required by a new application. If the newly stored data is subject to a high volume of transactions, the physical storage unit from which the additional physical storage was allocated will experience a workload increase indirectly related to the provision of new storage on the virtual device.

A problem that is thus unique to storage-management systems, and is particularly relevant to thin-provisioning storage-management systems, is that dynamic storage-allocation and load-balancing functions are today performed independently, generally by two different components of the storage-management system. This results in less accurate and less efficient storage allocation. There is therefore a need for a way to integrate storage allocation and load-balancing functions into a single operation, such that that the storage-management system may perform allocation and balancing tasks more efficiently and accurately.

BRIEF SUMMARY

One embodiment of the present invention provides storage-allocation system comprising:
a processor,
a memory coupled to the processor,
a computer-readable hardware-storage device coupled to the processor, where the storage device contains program code configured to be run by the processor via the memory to implement a method for workload-aware thin provisioning of a plurality of physical storage volumes, each of which is comprised by one pool of a plurality of shared pools of physical storage, and
a set of client computer-storage controllers coupled to the processor that are each capable of moving a volume of the plurality of physical storage volumes between two pools of the plurality of shared pools,
the method comprising:
identifying, for a first pool of the plurality of shared pools, a maximum workload that may be directed to the first pool and a maximum amount of physical storage capacity that may be allocated from the first pool to one or more virtual resources;
receiving a workload profile and a capacity profile for each volume of the plurality of physical storage volumes, where the first pool comprises a first volume of the plurality of physical storage volumes,
where a first workload profile and a first capacity profile is received for the first volume,
where the first workload profile comprises time-stamped records that each identify a workload directed to the first volume at a past time, and
where the first capacity profile comprises time-stamped records that each identify an amount of physical storage capacity allocated from the first volume at a previous time;
predicting, as a function of the first workload profile and the first capacity profile, a predicted amount of physical storage expected to be allocated from the first volume at a future time t;
forecasting, as a function of the first workload profile, the first capacity profile, and the predicted amount of physical storage, a forecasted workload expected to be directed to the first volume at the future time t;
determining that a conflict will occur at the future time t that prevents the forecasted workload from being directed to the first volume at the same time that the predicted amount of physical storage is allocated from the first volume;
resolving the conflict by directing the client computer-storage controllers to move a lowest-cost volume of the plurality of physical storage volumes from the first pool to a second pool of the plurality of shared pools.

Another embodiment of the present invention provides method for workload-aware thin provisioning of a plurality of physical storage volumes comprised by a plurality of shared pools of physical storage, the method comprising:

identifying, for a first pool of the plurality of shared pools of physical storage, a maximum workload that may be directed to the first pool and a maximum amount of physical storage capacity that may be allocated from the first pool to one or more virtual resources;

receiving a workload profile and a capacity profile for each volume of the plurality of physical storage volumes, where the first pool comprises a first volume of the plurality of physical storage volumes, where a first workload profile and a first capacity profile is received for the first volume, where the first workload profile comprises time-stamped records that each identify a workload directed to the first volume at a past time, and where the first capacity profile comprises time-stamped records that each identify an amount of physical storage capacity allocated from the first volume at a previous time;

predicting, as a function of the first workload profile and the first capacity profile, a predicted amount of physical storage expected to be allocated from the first volume at a future time t;

forecasting, as a function of the first workload profile, the first capacity profile, and the predicted amount of physical storage, a forecasted workload expected to be directed to the first volume at the future time t;

determining that a conflict will occur at the future time t that prevents the forecasted workload from being directed to the first volume at the same time that the predicted amount of physical storage is allocated from the first volume;

resolving the conflict by directing a set of client computer-storage controllers to move a lowest-cost volume of the plurality of physical storage volumes from the first pool to a second pool of the plurality of shared pools, where the set of client computer-storage controllers.

Yet another embodiment of the present invention provides a computer program product, comprising a computer-readable hardware storage device having a computer-readable program code stored therein, the program code configured to be executed by a storage-allocation system comprising:

a processor, a memory coupled to the processor, a computer-readable hardware-storage device coupled to the processor, where the storage device contains program code configured to be run by the processor via the memory to implement a method for workload-aware thin provisioning of a plurality of physical storage volumes, each of which is comprised by one pool of a plurality of shared pools of physical storage, and a set of client computer-storage controllers coupled to the processor that are each capable of moving a volume of the plurality of physical storage volumes between two pools of the plurality of shared pools, the method comprising:

identifying, for a first pool of the plurality of shared pools, a maximum workload that may be directed to the first pool and a maximum amount of physical storage capacity that may be allocated from the first pool to one or more virtual resources;

receiving a workload profile and a capacity profile for each volume of the plurality of physical storage volumes, where the first pool comprises a first volume of the plurality of physical storage volumes, where a first workload profile and a first capacity profile is received for the first volume, where the first workload profile comprises time-stamped records that each identify a workload directed to the first volume at a past time, and where the first capacity profile comprises time-stamped records that each identify an amount of physical storage capacity allocated from the first volume at a previous time;

predicting, as a function of the first workload profile and the first capacity profile, a predicted amount of physical storage expected to be allocated from the first volume at a future time t;

forecasting, as a function of the first workload profile, the first capacity profile, and the predicted amount of physical storage, a forecasted workload expected to be directed to the first volume at the future time t;

determining that a conflict will occur at the future time t that prevents the forecasted workload from being directed to the first volume at the same time that the predicted amount of physical storage is allocated from the first volume;

resolving the conflict by directing the client computer-storage controllers to move a lowest-cost volume of the plurality of physical storage volumes from the first pool to a second pool of the plurality of shared pools.

DETAILED DESCRIPTION

Figure 1:
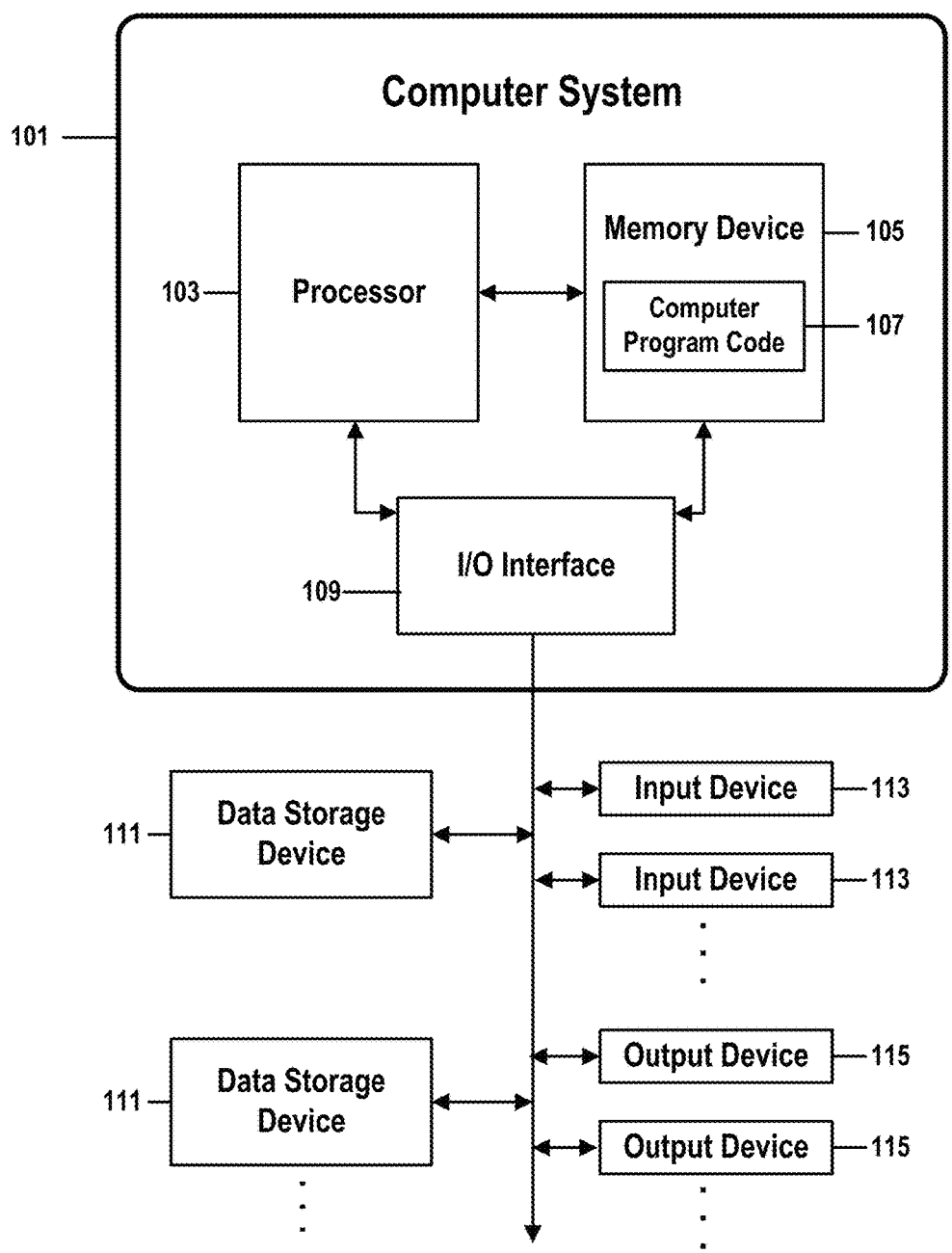
FIG. 1 shows the structure of a computer system and computer program code that may be used to implement a method for a workload-aware thin-provisioning storage-allocation system in accordance with embodiments of the present invention.

In a virtualized storage-management system that uses thin-provisioning techniques of storage allocation, the task of allocating virtual storage from a pool of physical storage is generally considered to be unrelated to workload-balancing tasks. Existing thin-provisioning storage-management systems at most consider workload in a simplistic manner, assuming that an increasing frequency of a volume's write operations increases a likelihood that the volume will require greater capacity. Current systems thus use an algorithm or software module to manage storage allocation that is almost completely independent of the algorithm or software module used to balance workloads.

As described in the BACKGROUND, however, allocation and balancing operations are not completely decoupled and can have indirect, but significant, effects on each other. A storage-management mechanism that uses independent mechanisms to perform these operations are not in general consider or account for these effects.

The present invention integrates these two operations into a workload-aware thin-provisioning mechanism capable of identifying and accounting for intrinsic relationships between workload-balancing tasks and capacity-allocation tasks. As a result, the present invention can increase the efficiency of a virtualized storage-management system by integrating workload-aware factors into the system's storage-allocation function.

Specifically, the storage capacity of a device is dynamically allocated by considering its historical capacity profile and workload profile, as well as the total physical capacity constraint in a pool and the workload balancing constraint.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for a workload-aware thin-provisioning storage-allocation system in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for a workload-aware thin-provisioning storage-allocation system in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for a workload-aware thin-provisioning storage-allocation system.

Any of the components of the present invention could be created, integrated, hosted, maintained, deployed, managed, serviced, supported, etc. by a service provider who offers to facilitate a method for a workload-aware thin-provisioning storage-allocation system. Thus the present invention discloses a process for deploying or integrating computing infrastructure, comprising integrating computer-readable code into the computer system 101, wherein the code in combination with the computer system 101 is capable of performing a method for a workload-aware thin-provisioning storage-allocation system.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for a workload-aware thin-provisioning storage-allocation system may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for a workload-aware thin-provisioning storage-allocation system is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

In embodiments described herein, interfaces 109 and storage devices 115 comprise means by which computer system 101 may perform tasks related to thin-provisioning shared pools of physical storage. These means may comprise storage controllers and networking interfaces that enable the computer system 101 to allocate and deallocate physical storage from particular physical volumes or to migrate a physical volume from one shared storage pool to another, as shown in FIGS. 2-3.

Embodiments of the present invention may be implemented as a method performed by a processor of a computer system, as a computer program product, as a computer system, or as a processor-performed process or service for supporting computer infrastructure.

Figure 2:
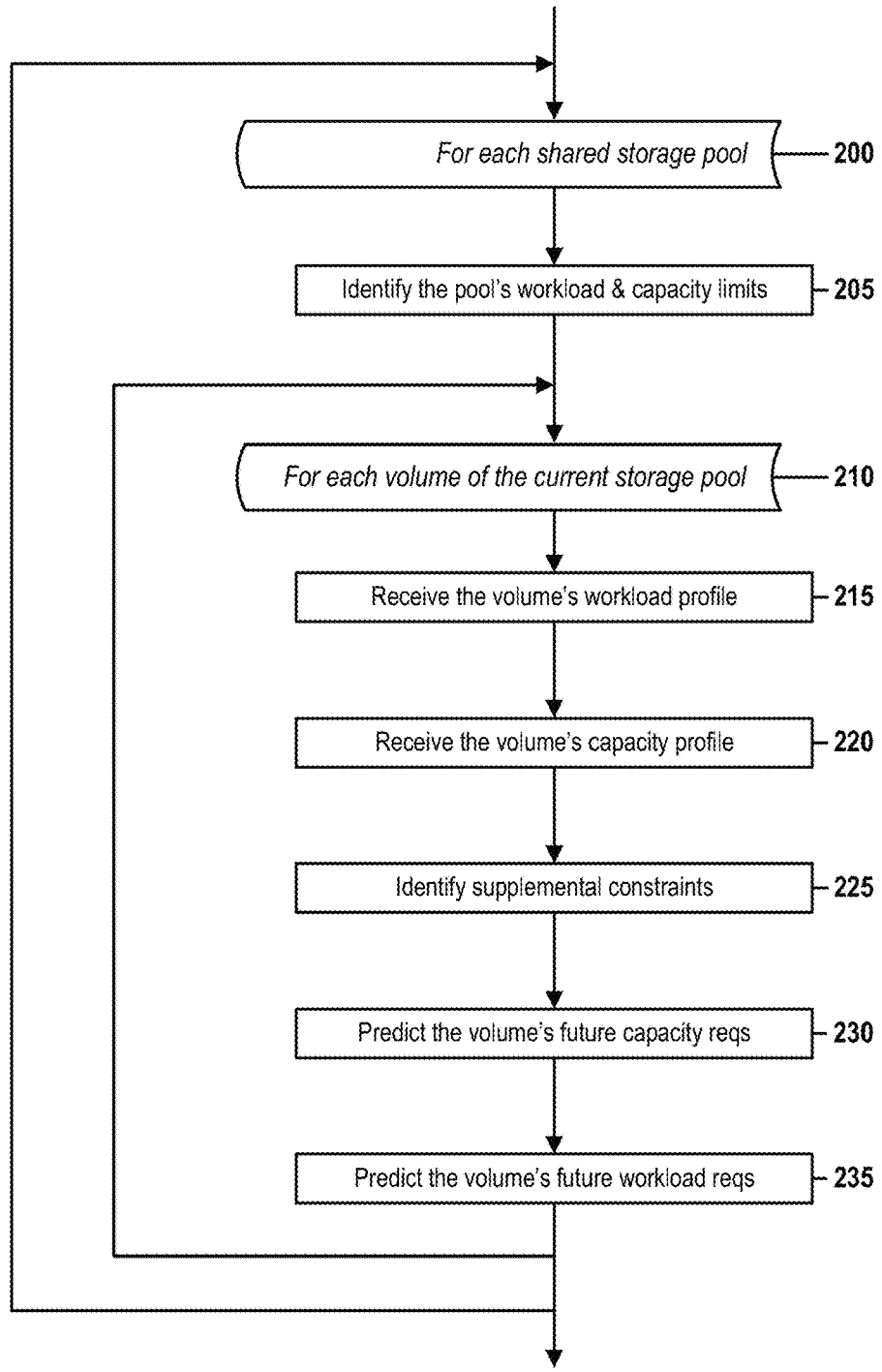
FIG. 2 is a flow chart that illustrates steps of a method for a workload-aware thin-provisioning storage-allocation system in accordance with embodiments of the present invention.
Figure 3:
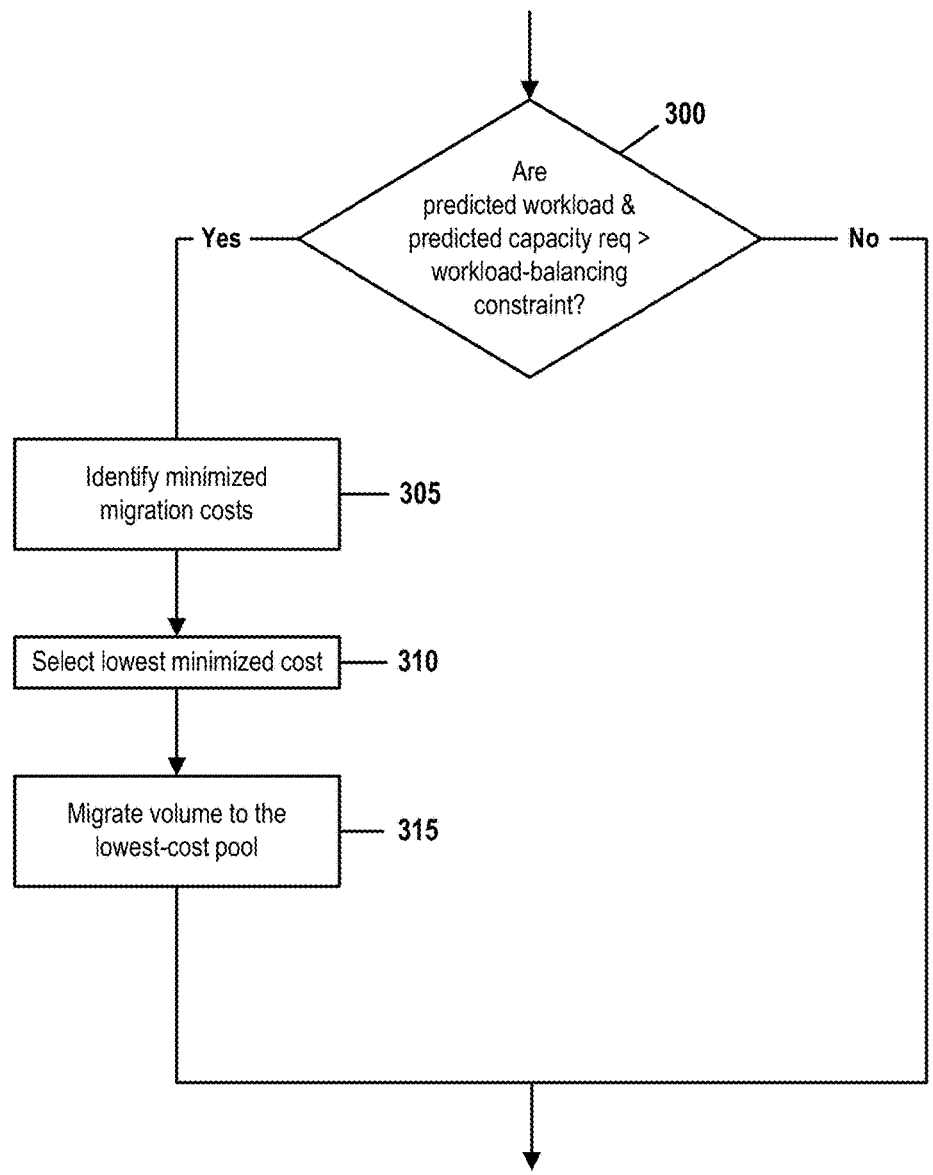
FIG. 3 is a flow chart that illustrates additional steps of a method for a workload-aware thin-provisioning storage-allocation system in accordance with embodiments of the present invention.

FIG. 2 is a flow chart that illustrates steps of a method for a workload-aware thin-provisioning storage-allocation system in accordance with embodiments of the present invention. The final steps of this method are shown in FIG. 3. FIG. 2 shows steps 200-236.

Step 200 initiates an outermost iterative procedure of steps 205-235. This outermost loop is performed once for every pool j of physical storage, where each pool j comprises n physical volumes v.

In step 205, a processor of a thin-provisioning storage-management system receives or otherwise identifies a threshold storage-allocation limit and a threshold workload limit of the pool j currently being processed by the outermost iterative procedure.

The storage-allocation limit identifies a maximum amount of physical storage capacity that may be allocated from pool j to one or more virtual volumes. This limit may be as simple as a total physical capacity of all volumes v comprised by pool j, or it may be a function of that total physical capacity. For example, if a manufacturer specification, an industry convention, or a business policy considers a physical volume to be "fully allocated" when 95% of the volume's physical capacity has been allocated, a pool's storage-allocation limit may equal 95% of the sum of all physical capacity of all volumes comprised by the pool. Embodiments of the present invention may accommodate any threshold storage-allocation limit deemed desirable by an implementer. In other cases, the storage-allocation limit may be identified by other means known in the art, such as by querying a disk controller component, a system-configuration software module, or stored system-configuration information.

Similarly, the threshold workload limit of the currently processed pool j identifies a maximum amount of workload that may be handled by pool j. This maximum workload may be expressed in units of input/output operations/second, read transactions/second, write transactions/second, or any other unit known in the field. This workload limit may be defined by any means acceptable to an implementer, such as selecting a limit specified by a manufacturer, choosing a threshold beyond which performance has in the past degraded, or estimating a limit as a function of a physical volume's known maximum I/O bandwidth.

As with the storage-allocation limit, embodiments of the present invention may accommodate any workload limit deemed reasonable by an implementer. In a simplest case, this limit may be arbitrarily set to a figure that is 70% of a physical volume's specified I/O bandwidth.

Step 210 initiates an innermost iterative procedure of steps 205-235. This procedure is repeated once for every physical volume comprised by one or more shared pools of physical storage units.

This thin-provisioning system may be part of a larger virtual storage-management system or it may be a module, plug-in, or other software component intended to interoperate with a larger virtual storage-management system.

As described above, the thin-provisioning system automatically and dynamically allocates physical storage as needed by users from the one or more shared pools to a set of virtual storage devices visible to users. Each physical storage device of a shared pool may comprise one or more volumes of physical storage and each virtual storage device provisioned to a user may comprise one or more volumes of virtual storage.

In step 215, the system receives a workload profile for the current physical volume. This profile lists workloads managed by the volume at specific times in the past, and will be used to help predict future workloads that may be imposed on the current volume.

One example of such a workload profile for an exemplary Volume P090100375 might comprise entries:

TABLE 1

| Volume P90375 | |
|---|---|
| Date/Time | Workload (IOPS) |
| 20160901:00:01:00:000 | 0109 |
| 20160901:00:01:00:050 | 0155 |
| 20160901:00:01:01:000 | 3410 |
| 20160901:00:01:01:050 | 9721 |
| 20160901:00:01:02:000 | 9542 |
| 20160901:00:01:02:050 | 2002 |
| 20160901:00:01:03:000 | 0041 |
| 20160901:00:01:03:050 | 0056 |

The first line of this example shows that physical Volume P090100375 performed 109 I/O operations per second at 12:01 AM on Sep. 1, 2016. The next line shows that, at a time 0.5 seconds later, Volume P090100375 performed 155 I/O operations per second.

A real-world workload profile may comprise large numbers of such time-stamped workload figures, which may be collected by means known in the art, such as by a logging function of a storage-management system. In any particular embodiment, the range of time identified by the workload profile and the frequency of workload measurements may be freely determined as a function of a goal or intent of the embodiment, of a technical constraint, or of other implementation-dependent details. In general, however, more accurate results may be obtained when workload profiles contain a greater total number of workload measurements, a greater frequency of measurements, or a longer span of time over which measurements are collected.

In step 220, the system receives a capacity profile for the current physical volume. This profile lists the amount of physical storage capacity that was allocated at specific times in the past from the physical volume to one or more virtual volumes. This information will be used to help predict amounts of storage that may be expected to be allocated from the volume in the future.

One example of such a capacity profile for Volume P090100375 might comprise entries:

TABLE 2

| Volume P90375 | |
| --- | --- |
| Date/Time | Allocated Capacity (TB) |
| 20171030:14:27:00 | .13 |
| 20171030:14:27:05 | .13 |
| 20171030:14:27:10 | .45 |
| 20171030:14:27:15 | .49 |
| 20171030:14:27:20 | .49 |
| 20171030:14:27:25 | .49 |
| 20171030:14:27:30 | .24 |
| 20171030:14:27:35 | .46 |

The first line of this example shows that 0.13 TB of physical storage comprised by physical Volume P090100375 was allocated to virtual storage volumes at 2:27 PM on Oct. 30, 2017. The second line shows that the same amount of physical storage was allocated from the volume five seconds later, and the third line shows that, five seconds after the second measurement, a total of 0.45 TB of physical storage was allocated from the volume.

A real-world capacity profile may comprise large numbers of such time-stamped capacity-allocation figures. Like the workload profile, a capacity profile may contain information collected by means known in the art, such as by a logging function of a storage-management system or by a hardware-maintenance utility.

As with the workload profile, the range of time identified by a capacity profile and the frequency of capacity measurements may be freely determined as a function of a goal or intent of the embodiment, of a technical constraint, or of other implementation-dependent details. In general, however, more accurate results may be obtained when capacity profiles contain a greater total number of capacity measurements, a greater frequency of measurements, or a longer span of time over which measurements are collected.

This document contains examples of workload profiles and capacity profiles that contain measurements sampled at fixed, periodic times. But in other embodiments, there is no such constraint on the times at which measurements are sampled. Workload and capacity measurements may be recorded at irregular intervals, at random intervals, at certain times of day, when certain conditions are met, or as a function of any other rules that an implementer might deem to provide more representative or typical results.

In step 225, the system optionally identifies supplementary constraints associated with the shared pools and the virtual volumes provisioned from the pools' physical storage.

In various embodiments, these constraints may comprise one or more optional contractual, technical, service-oriented, or other types of supplementary or ad hoc constraints, as selected by implementers in order to customize an embodiment of the present invention.

Some embodiments of the present invention may accommodate a wide range of these supplementary or ad hoc constraints, which may be selected at will by implementers. If, for example, a business's system-maintenance policy requires all virtual volumes associated with the same virtual machine to be provisioned from the same pool, then that constraint may be selected and identified in this step. Other ad hoc constraints may be identified at will by an implementer if, for example, the constraints are required by a term of a service agreement, represent a manufacturer recommendation limiting a particular component's workload or storage utilization, or arise from a technical limitation of a hardware, software, or networking component.

In step 230, the system performs computations that predict the current volume's future capacity requirements. This is performed by means of novel applications of well-known computational techniques, such as a linear-regression analysis or a vector autoregression function for multivariate time series analysis.

If a storage pool j comprises n physical volumes, the allocated real capacity of a volume $v_i$ at a time t (such as the time-stamped entries of the capacity profile) may each be denoted as $AS^t(v_i)$. For example, by setting time t1=20171030:14:27:00, the first entry of Table 2 may be denoted as $AS^{t1}(P90375)=0.13$ TB, meaning that 0.13 TB of physical storage had been allocated from physical volume P90375 at time 20171030:14:27:00.

Similarly, the workload of a volume $v_i$ at a time t (such as the time-stamped entries of the workload profile) may each be denoted as $IOPS^t(v_i)$. For example, by setting time t2=20160901:00:01:00:000, the first entry of Table 1 may be denoted as $IOPS^{t2}(P90375)=109$ IOPS, meaning that physical volume P90375 experienced a workload of 109 I/O operations/second at time 20160901:00:01:00:000.

An amount of real storage of volume $v_i$ expected "to be allocated" at a future time t may be defined as $TBAS^t(v_i)$. Embodiments of the present invention in this step attempt to predict future storage allocations by computing values for TBAS at future times t.

$TBAS^t(v_i)$ for a particular volume $v_i$ at a future time t may be determined as a function $f_c$ of information received in the capacity profile and in the workload profile. Function $f_c$ may be identified by means of methods known in the art, such as by means of a linear regression analysis, performed on an equation:

$$TBAS^t(v_i)=f_c(AS^{t-1}(v_i), AS^{t-2}(v_i), \ldots AS^{t-q1}(v_i), IOPS^{t-1}(v_i), IOPS^{t-2}(v_i), \ldots IOPS^{t-q2}(v_i)) \quad (1)$$

where q1 is a time range within which to consider past capacity allocations for volume $v_i$ and q2 is a time range within which to consider past workloads for volume $v_i$. q1 and q2 may be selected arbitrarily or as a function of technical or information-gathering constraints. The most important consideration when selecting q1 and q2 is that those selections determine the number of AS and IOPS terms considered in Eq. 1. A greater number of terms will increase the fit accuracy of function $f_c$, but will increase computational complexity and may generate overfitting errors of a linear regression analysis performed on Eq. 1. As in any linear regression, a person skilled in the art will know how to optimize Eq. (1) by adjusting the number of terms. And the easiest way to adjust the number of those terms is to adjust the boundaries of time spans q1 and q2.

Deriving a solution to Eq. (1), is subject to an additional constraint. Every pool j of physical storage has a maximum physical storage capacity C(j), received or otherwise identified by the processor in step 205. C(j) is thus an upper limit at time t upon the sum of: i) the total amount of physical storage that may be allocated from all n volumes of pool j at time t and ii) the to-be-allocated capacity derived for all n volumes $v_i$ at time t.

This relationship may be expressed as:

$$\Sigma_{i=1}{}^{n}=AS^{t}(v_i)+TBAS^{t}(v_i) \leq C(j) \qquad (2)$$

Solving Eq. (1), subject to the constraint of Eq. (2), by means of a standard linear-regression analysis thus predicts a value of the storage capacity to be allocated from volume $v_i$ at time t. This computation may be performed for all times t within any range of time q1 (or from time t-q1 through time 1) during which thin provisioning is expected to be required. If, for example, an embodiment of the present invention is designed to predict thin-provisioning decisions for the next three minutes, Equations (1) and (2) may be used to compute values of $TBAS^{t}(v_i)$ for a period of time ranging from the time of computation through a time three minutes after the time of computation. This computation may in some embodiments be continuously repeated in order to continue to compute values of $TBAS^{t}(v_i)$ during a sliding three-minute window.

In step 235, the system performs computations that predict the current volume's workload requirements at future times. This is performed by means of novel applications of well-known computational techniques, such as a linear-regression analysis or a vector autoregression function for multivariate time series analysis.

As described in step 230, a storage pool j may comprise n physical volumes v, and a workload imposed upon a volume $v_i$ at a time t (such as the time-stamped entries of the workload profile) may be denoted as $IOPS^{t}(v_i)$. Embodiments of the present invention in this step attempt to predict future workloads on each volume by computing values for IOPS at future times t that occur within a time span q2. Analogous to time span q1 in step 230, q2 may be set to be any historical range of time over which an implementer desires to consider past workloads imposed upon volume $v_i$.

Analogous to computations for deriving $TBAS^{t}(v_i)$, $IOPS^{t}(v_i)$ for a particular volume $v_i$ at a future time t may be determined as a function $f_w$ of received information comprised by the capacity profile and by the workload profile. Like function $f_c$, function $f_w$ may be identified by computational methods known in the art, such as a linear regression analysis, performed on an equation:

$$IOPS^{t}(v_i)=f_w(IOPS^{t-1}(v_i), IOPS^{t-2}(v_i), \ldots IOPS^{t-q2}(v_i), AS^{t-1}(v_i), AS^{t-2}(v_i), \ldots AS^{t-q1}(v_i), TBAS^{t}(v_i)) \qquad (3)$$

Like Eq. (1), Eq. (3) is subject to an additional constraint received or otherwise identified by the system in step 205. In this case, the additional constraint W(j) identifies a maximum workload that may be handled by all volumes comprised by pool j. At any time t, $\overline{IOPS^{t}}(j)$ (the mean or average workload of all physical volumes v of pool j), cannot exceed the maximum workload W(j) of pool j. This workload-balancing constraint may be expressed as:

$$\overline{IOPS^{t}}(j) = \frac{\sum_{i=1}^{n} IOPS^{t}(v_i)}{n(j)} \leq W(j) \qquad (4)$$

where n(j) is the total number of volumes in pool j.

Solving Eq. (3), subject to the constraint of Eq. (4) by means of a standard linear-regression analysis thus predicts a likely workload to be required from volume $v_i$ at time t. Like the computation of Eq. 1, this computation may be performed for all times t within any range of time q2 (or from time t-q2 through time t) during which thin provisioning is expected to be required.

In one example, the method of FIG. 2 may be used to determine to-be-allocated physical-storage allocation and expected workloads for every volume $v_i$ of a pool j by using known techniques of linear-regression analysis to solve Equations (1) and (3), subject to constraints of Equations (2) and (4). In this example, functions $f_c$ and $f_w$ of Equations (1) and (3) may be expressed as:

$$TBAS^{t}(v_{i \in j}) = \beta_1 AS^{t-1}(v_i) + \beta_2 AS^{t-2}(v_i) + \ldots \beta_{q1} AS^{t-q1}(v_i) + \alpha_1 IOPS^{t-1}(v_i) + \alpha_2 IOPS^{t-2}(v_i) + \ldots \alpha_{q2} IOPS^{t-q2}(v_i) + \varepsilon_t \qquad (1a)$$

$$IOPS^{t}(v_{i \in j}) = \alpha_1 IOPS^{t-1}(v_i) + \alpha_2 IOPS^{t-2}(v_i) + \ldots \alpha_{q2} IOPS^{t-q2}(v_i) + \beta_1 AS^{t-1}(v_i) + \beta_2 AS^{t-2}(v_i) + \ldots \beta_{q1} AS^{t-q1}(v_i) + \gamma TBAS^{t}(v_i) + \varepsilon_t \qquad (3a)$$

where each $\alpha$, $\beta$, and $\gamma$ is a coefficient and $\varepsilon_t$ is the error term, following a normal distribution.

In another example, if identical time windows q1 and q2 are chosen for storage-allocation capacity profiles $AS^{t}(v_i)$ and workload profiles $IOPS^{t}(v_i)$, these computations may more simply derive functions $f_c$ and $f_w$ as vector autoregression functions for a multivariate time series analysis. In such a case, each variable becomes a linear function of past lags of itself and of the lags of the other variables.

If the time window size of both capacity and workload profiles is a duration of time q, the vector autoregression model of lag q at time t for all volumes v of pool j is defined as:

$$y^{t}(v_{i \in j}) = A_1 y^{t-1}(v_i) + \ldots A_q y^{t-q}(v_i) + u_t \qquad (5)$$

where $y^{t}(v_{i \in j}) = (IOPS^{t}(v_i), TBAS^{t}(v_i))^{T}$ (T denoting a matrix transposition), each A is a coefficient matrix for $i=1, \ldots, q$, $A_i=(\alpha_i, \beta_i)^{T}$, and $u_t$ is the error term, following a multivariate normal distribution. In this example, Eq. (5) replaces both equations (1) and (3).

At the conclusion of step 235, the innermost iterative procedure of steps 210-235 will have completed an iteration that derives $TBAS^{t}(v_i)$ and $IOPS^{t}(v_i)$ for one volume v of one pool j.

At the conclusion of a last iteration of the innermost procedure of steps 210-235, the system will have derived $TBAS^{t}(v_i)$ and $IOPS^{t}(v_i)$ for all volumes $v_i$ of one shared pool j. The method of FIG. 2 will then continue with the next iteration of the outermost procedure of steps 200-235, to begin processing volumes of the next pool.

At the conclusion of the final iteration of the outermost procedure, the system will have derived values of $TBAS^{t}(v_i)$ and $IOPS^{t}(v_i)$ for all volumes $v_i$ of all shared pools. Embodiments of the present invention will then continue with the procedure of FIG. 3.

FIG. 3 is a flow chart that illustrates additional steps of a method for a workload-aware thin-provisioning storage-allocation system in accordance with embodiments of the present invention. FIG. 3 contains steps 300-315.

The system continues from step 235 of FIG. 2 to perform the method of FIG. 3. Steps of FIG. 3 are performed after completing the final iteration of the iterative procedure of steps 200-235 of FIG. 2. The method of FIG. 3 may be performed once for each shared pool j of physical storage.

In step 300, the system determines whether a predicted storage-allocation TBAS and a predicted workload IOPS will result in a violation of the pool workload-balancing constraint identified by Eq. (4) at a future time t or will result in the maximum-capacity constraint of Eq. (2). As discussed in the description of step 235 of FIG. 2, this may happen if the mean workload of volumes comprised by a pool will at a time t exceed a maximum-workload threshold value for that pool or if the total physical storage capacity to be allocated from volumes of a pool at time t exceeds the maximum capacity of that entire pool.

If either violation is predicted to occur at time t for a volume of a pool j, performing the TBAS pool j storage reallocation identified at time t would prevent pool j from continuing to operate. In such a case, the method of FIG. 3 must perform remedial action, by means of steps 305-315, at or before time t. This remedial action may comprise an attempt to balance workloads among storage pools by moving a volume from an overloaded pool to another pool that has a lighter workload. In this way, a single integrated mechanism may combine workload-balancing and storage-allocation tasks, allowing workloads to be rebalanced by adjusting the distribution of physical volumes of storage among shared pools.

But if the system in step 300 determines that no violation has occurred, the current iteration of the method of FIG. 3 ends and another iteration is performed for the next shared pool of physical storage. This procedure may continue indefinitely, or it may be performed once for each pool. In the latter case, some embodiments may perform some or all steps of the method of FIG. 2 after every pool has been considered by the method of FIG. 3.

In step 305, the system determines a minimized allocation cost associated with moving a volume from an overloaded pool that has too large a workload to a pool that has a lighter workload.

Relocating a physical volume from one storage pools requires nontrivial resources, which are referred to as a cost of moving that volume. If all volumes of a pool satisfy both the maximum capacity constraint of Eq. (2) and the workload-balancing constraint of Eq. (4), no cost will be incurred because no volumes will be moved between pools.

If a cost is, however, incurred by a need to satisfy either the capacity or workload-balancing constraint by moving a volume to a different pool the system will in this step attempt to minimize that cost. If the $C(i,j)^t$ is a cost required to assign volume i to pool j at time t, and $x(ij)^t$ is an assignment function that returns 1 if the volume assignment is complete and returns 0 otherwise, a minimized cost may be identified by minimizing the function:

$$\Sigma_{v_i \in V} \Sigma_{pool_j \in P} C(i,j)^t x(i,j)^t$$

where P is the set of all pools and V is the set of all volumes of all pools.

This minimization procedure may be performed by any minimization procedure known in the art, such as the simplex method, where a feasible solution set forms a polytope defined by a constraints applied to the objective function. In the present invention, for example, the simplex method would test adjacent vertices of a feasible solution set in sequence such that the objective function improves or is unchanged at each new vertex.

The minimization must also be performed subject to equations (1) and (3) and to the following additional constraints:

$$\sum_{v_i \in pool_j} AS(v_i) + TBASt(v_i) \leq C(j)$$

$$\overline{IOPS}^t(j) = \frac{\sum_{v_i \in pool_j} IOPS^t(v_i)}{n(j)} \leq W(j)$$

$$\sum_{pool_j \in P} x_{ij}^t = 1 \text{ for } v_i \in V$$

$$\sum_{v_i \in V} x_{ij}^t = MAX(j) \text{ for } pool_j \in P$$

$$x_{ij}^t \geq 0 \text{ for } v_i \in V, pool_j \in P$$

where n(j) is the total number of volumes in pool j and where MAX(j) is a maximum number of pools that may be comprised by pool j. MAX(j) and n(j) may be identified automatically by the system, may be entered by a user, may be predefined by a business policy, may be selected arbitrarily by an implementer, or may be chosen by any other criteria preferred by a user.

In some embodiments, these computations may be further subject to additional supplemental constraints received in step 225. This computation may be performed multiple times, each time determining a minimum cost incurred by moving a volume $v_i$ to a different pool.

In step 310, the system selects a pool associated with the lowest minimum cost identified in step 305. If, for example, there are four pools a, b, c, and d and the system in step 300 determines that predicted storage-capacity allocation and workload requirements will be impossible for pool a to satisfy at time t, then one or more volumes of pool a must be migrated to pool b, c, or d. When the system in step 305 computes the minimized cost to move the one or more volumes to either of the three pools, the system determines that the lowest minimized cost is incurred when the volumes are moved to pool b. The system then selects pool b as the optimal target for the migrating volume.

The costs may comprise any expense or consumption of resources deemed significant by an implementer, or any other resource required to migrate a volume from a first storage pool to a second storage pool. For example, a cost may be determined as a duration of time required to complete the migration, where a migration that takes longer to complete is considered more costly. In other examples, employee costs incurred by a migration may be considered significant, thus resulting in a move that requires greater employee time being considered more costly. Many other definitions and computations of economic or financial cost, as are known in the art, may be accommodated by embodiments of the present invention.

In some embodiments, it may be impossible to resolve a pool's predicted workload or capacity-allocation problems by moving only one physical volume from that pool to another pool. In such cases, where moving multiple physical volumes is necessary, the minimized-cost computations of step 310 may determine that the multiple volumes may most cost-effectively be moved to different pools.

In general, when there is a choice of which volume of an overloaded pool must be moved to a different pool, volume choice may be made by a method selected by an implementer. The most straightforward approach is to move the volume that has the greatest workload at future time t (if the problem to be solved is a violation of the workload-balancing constraint of Eq. (4)) or that has the greatest amount of allocated storage (if the problem to be solved is a violation of the storage-capacity constraint of Eq. (2)). Other methods may also be used, such as selecting a minimal set of lower-workload or lower-allocation volumes, at the discretion of an implementer. Embodiments of the present invention may accommodate such variations if desired by an implementer.

In step 315, the system performs the lowest-cost volume move or schedules the lowest-cost volume move to be performed at a time at or before time t. This move is performed by means of the networks, I/O interfaces 109, and storage devices 111 described in FIG. 2.

In some embodiments, the system will not yet perform the lowest-cost move, instead continuing through additional repetitions of the methods of FIG. 2 and FIG. 3, each time revising the lowest minimized cost determination of step 310 by processing successively more current, updated workload profiles and capacity profiles. In such embodiments, the system will implement the lowest-cost move as late as possible, using the latest profile data, in order to most accurately identify a constraint violation and to most accurately select a lowest-cost solution to such a violation.

At the conclusion of step 315, the method of FIG. 3 may repeat once for each shared pool of physical storage. At the conclusion of the last repetition of the method of FIG. 3, some embodiments of the present invention will resume performing steps of the method of FIG. 2.

What is claimed is:

1. A storage-allocation system comprising:
a processor,
a memory coupled to the processor,
a computer-readable hardware-storage device coupled to the processor, where the storage device contains program code configured to be run by the processor via the memory to implement a method for workload-aware thin provisioning of a plurality of physical storage volumes, each of which is comprised by one pool of a plurality of shared pools of physical storage, and
a set of client computer-storage controllers coupled to the processor that are each capable of moving a volume of the plurality of physical storage volumes between two pools of the plurality of shared pools,
the method comprising:
identifying, for a first pool of the plurality of shared pools, a maximum workload that may be directed to the first pool and a maximum amount of physical storage capacity that may be allocated from the first pool to one or more virtual resources;
receiving a workload profile and a capacity profile for each volume of the plurality of physical storage volumes,
where the first pool comprises a first volume of the plurality of physical storage volumes,
where a first workload profile and a first capacity profile is received for the first volume,
where the first workload profile comprises time-stamped records that each identify a workload directed to the first volume at a past time, and
where the first capacity profile comprises time-stamped records that each identify an amount of physical storage capacity allocated from the first volume at a previous time;
predicting, as a function of the first workload profile and the first capacity profile, a predicted amount of physical storage expected to be allocated from the first volume at a future time t;
forecasting, as a function of the first workload profile, the first capacity profile, and the predicted amount of physical storage, a forecasted workload expected to be directed to the first volume at the future time t;
determining that a conflict will occur at the future time t that prevents the forecasted workload from being directed to the first volume at the same time that the predicted amount of physical storage is allocated from the first volume;
resolving the conflict by directing the client computer-storage controllers to move a lowest-cost volume of the plurality of physical storage volumes from the first pool to a second pool of the plurality of shared pools.

2. The system of claim 1, where the resolving further comprises:
computing a set of minimized migration costs that each identifies a minimum cost incurred by moving a selected volume of the first pool to a different pool of the plurality of shared pools; and
selecting the lowest-cost volume and the second pool such that the lowest cost of the set of minimized migration costs is incurred by moving the lowest-cost volume to the second pool.

3. The system of claim 1, where the predicting comprises performing a linear-regression analysis on a linear equation subject to a constraint imposed by the maximum amount of physical storage capacity, where terms of the linear equation are derived from two or more time-stamped records of the first workload profile and from two or more time-stamped records of the first capacity profile.

4. The system of claim 1, further comprising:
computing a workload-balancing constraint at the future time t as a mean value of workloads directed to all volumes of the first pool at the future time t.

5. The system of claim 4, where the forecasting comprises performing a linear-regression analysis on a linear equation subject to the workload-balancing constraint, where terms of the linear equation are derived from two or more of the time-stamped records of the first workload profile, two or more time-stamped records of the first capacity profile, and the predicted amount of physical storage.

6. The system of claim 1, where the determining is performed by identifying that directing the forecasted workload to the first volume at the future time t and allocating the predicted amount of physical storage from the first volume at the future time t causes a resulting workload directed to the first pool to exceed the workload-balancing constraint.

7. The system of claim 1, where the determining is performed by identifying that directing the forecasted workload to the first volume at the future time t and allocating the predicted amount of physical storage from the first volume at the future time t causes a total amount of physical storage allocated from the first pool to exceed the maximum amount of physical storage capacity.

8. The system of claim 1, further comprising:
receiving a set of supplemental constraints, where the forecasting and the predicting comprise performing linear-regression analyses on a set of linear equations subject to one or more constraints of the set of supplemental constraints, where terms of the set of linear equations are derived from two or more time-stamped records of the first workload profile and from two or more time-stamped records of the first capacity profile.

9. A method for workload-aware thin provisioning of a plurality of physical storage volumes comprised by a plurality of shared pools of physical storage, the method comprising:
identifying, for a first pool of the plurality of shared pools of physical storage, a maximum workload that may be directed to the first pool and a maximum amount of physical storage capacity that may be allocated from the first pool to one or more virtual resources;

receiving a workload profile and a capacity profile for each volume of the plurality of physical storage volumes,
 where the first pool comprises a first volume of the plurality of physical storage volumes,
 where a first workload profile and a first capacity profile is received for the first volume,
 where the first workload profile comprises time-stamped records that each identify a workload directed to the first volume at a past time, and
 where the first capacity profile comprises time-stamped records that each identify an amount of physical storage capacity allocated from the first volume at a previous time;

predicting, as a function of the first workload profile and the first capacity profile, a predicted amount of physical storage expected to be allocated from the first volume at a future time t;

forecasting, as a function of the first workload profile, the first capacity profile, and the predicted amount of physical storage, a forecasted workload expected to be directed to the first volume at the future time t;

determining that a conflict will occur at the future time t that prevents the forecasted workload from being directed to the first volume at the same time that the predicted amount of physical storage is allocated from the first volume;

resolving the conflict by directing a set of client computer-storage controllers to move a lowest-cost volume of the plurality of physical storage volumes from the first pool to a second pool of the plurality of shared pools, where the set of client computer-storage controllers.

10. The method of claim 9, where the resolving further comprises:
 computing a set of minimized migration costs that each identifies a minimum cost incurred by moving a selected volume of the first pool to a different pool of the plurality of shared pools; and
 selecting the lowest-cost volume and the second pool such that the lowest cost of the set of minimized migration costs is incurred by moving the lowest-cost volume to the second pool.

11. The method of claim 9, where the predicting comprises performing a linear-regression analysis on a linear equation subject to a constraint imposed by the maximum amount of physical storage capacity, where terms of the linear equation are derived from two or more time-stamped records of the first workload profile and from two or more time-stamped records of the first capacity profile.

12. The method of claim 9, where the forecasting further comprises:
 computing a workload-balancing constraint at the future time t as a mean value of workloads directed to all volumes of the first pool at the future time t, and
 performing a linear-regression analysis on a linear equation subject to the workload-balancing constraint, where terms of the linear equation are derived from two or more of the time-stamped records of the first workload profile, two or more time-stamped records of the first capacity profile, and the predicted amount of physical storage.

13. The method of claim 9, where the determining is performed by identifying that directing the forecasted workload to the first volume at the future time t and allocating the predicted amount of physical storage from the first volume at the future time t causes a resulting workload directed to the first pool to exceed the workload-balancing constraint.

14. The method of claim 9, where the determining is performed by identifying that directing the forecasted workload to the first volume at the future time t and allocating the predicted amount of physical storage from the first volume at the future time t causes a total amount of physical storage allocated from the first pool to exceed the maximum amount of physical storage capacity.

15. The method of claim 9, further comprising providing at least one support service for at least one of creating, integrating, hosting, maintaining, and deploying computer-readable program code in the computer system, wherein the computer-readable program code in combination with the computer system is configured to implement the identifying, the receiving, the predicting, the forecasting, the determining, and the resolving.

16. A computer program product, comprising a computer-readable hardware storage device having a computer-readable program code stored therein, the program code configured to be executed by a storage-allocation system comprising:
 a processor,
 a memory coupled to the processor,
 a computer-readable hardware-storage device coupled to the processor, where the storage device contains program code configured to be run by the processor via the memory to implement a method for workload-aware thin provisioning of a plurality of physical storage volumes, each of which is comprised by one pool of a plurality of shared pools of physical storage, and
 a set of client computer-storage controllers coupled to the processor that are each capable of moving a volume of the plurality of physical storage volumes between two pools of the plurality of shared pools, the method comprising:
 identifying, for a first pool of the plurality of shared pools, a maximum workload that may be directed to the first pool and a maximum amount of physical storage capacity that may be allocated from the first pool to one or more virtual resources;
 receiving a workload profile and a capacity profile for each volume of the plurality of physical storage volumes,
  where the first pool comprises a first volume of the plurality of physical storage volumes,
  where a first workload profile and a first capacity profile is received for the first volume,
  where the first workload profile comprises time-stamped records that each identify a workload directed to the first volume at a past time, and
  where the first capacity profile comprises time-stamped records that each identify an amount of physical storage capacity allocated from the first volume at a previous time;
 predicting, as a function of the first workload profile and the first capacity profile, a predicted amount of physical storage expected to be allocated from the first volume at a future time t;
 forecasting, as a function of the first workload profile, the first capacity profile, and the predicted amount of physical storage, a forecasted workload expected to be directed to the first volume at the future time t;
 determining that a conflict will occur at the future time t that prevents the forecasted workload from being directed to the first volume at the same time that the predicted amount of physical storage is allocated from the first volume;

resolving the conflict by directing the client computer-storage controllers to move a lowest-cost volume of the plurality of physical storage volumes from the first pool to a second pool of the plurality of shared pools.

17. The computer program product of claim 16, where the resolving further comprises:

computing a set of minimized migration costs that each identifies a minimum cost incurred by moving a selected volume of the first pool to a different pool of the plurality of shared pools; and selecting the lowest-cost volume and the second pool such that the lowest cost of the set of minimized migration costs is incurred by moving the lowest-cost volume to the second pool.

18. The computer program product of claim 16, where the predicting comprises performing a linear-regression analysis on a linear equation subject to a constraint imposed by the maximum amount of physical storage capacity, where terms of the linear equation are derived from two or more time-stamped records of the first workload profile and from two or more time-stamped records of the first capacity profile.

19. The computer program product of claim 16, where the forecasting further comprises:

computing a workload-balancing constraint at the future time t as a mean value of workloads directed to all volumes of the first pool at the future time t, and performing a linear-regression analysis on a linear equation subject to the workload-balancing constraint, where terms of the linear equation are derived from two or more of the time-stamped records of the first workload profile, two or more time-stamped records of the first capacity profile, and the predicted amount of physical storage.

20. The computer program product of claim 16, where the determining is performed by identifying that directing the forecasted workload to the first volume at the future time t and allocating the predicted amount of physical storage from the first volume at the future time t causes either: a resulting workload directed to the first pool to exceed the workload-balancing constraint, or a total amount of physical storage allocated from the first pool to exceed the maximum amount of physical storage capacity.

* * * * *